Figure 1:
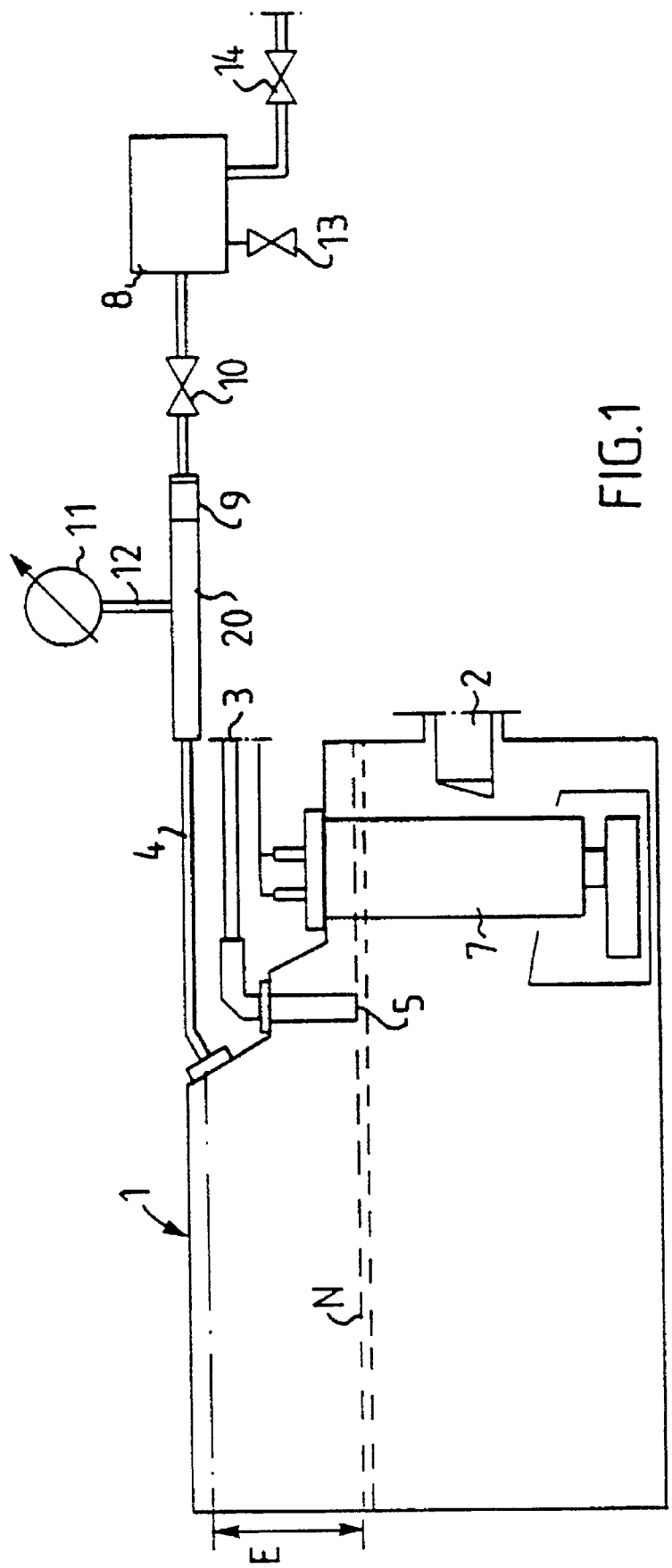

United States Patent [19]

Harde

[11] Patent Number: 5,632,242

[45] Date of Patent: May 27, 1997

[54] FUEL SYSTEM FOR MOTOR VEHICLES

[75] Inventor: Bo Harde, Gothenburg, Sweden

[73] Assignee: AB Volvo, Gothenburg, Sweden

[21] Appl. No.: 335,753

[22] PCT Filed: May 10, 1993

[86] PCT No.: PCT/SE93/00409

§ 371 Date: Nov. 14, 1994

§ 102(e) Date: Nov. 14, 1994

[87] PCT Pub. No.: WO93/23265

PCT Pub. Date: Nov. 25, 1993

[30] Foreign Application Priority Data

May 12, 1992 [SE] Sweden ................... 9201500

[51] Int. Cl.⁶ ................... B60K 15/035; F02M 25/08
[52] U.S. Cl. ................... 123/198 D; 123/520; 138/44
[58] Field of Search ................... 137/587; 123/198 D, 123/516, 518, 519, 520, 521; 138/44

[56] References Cited

U.S. PATENT DOCUMENTS

| | | | |
|---|---|---|---|
| 3,702,144 | 11/1972 | Loveland | 138/44 |
| 4,862,856 | 9/1989 | Yokoe et al. | 123/520 X |
| 4,949,695 | 8/1990 | Uranishi et al. | 123/520 |
| 5,085,194 | 2/1992 | Kuroda et al. | 123/520 X |
| 5,143,035 | 9/1992 | Kayanuma | 123/198 D |
| 5,172,672 | 12/1992 | Harada | 123/198 D X |
| 5,261,379 | 11/1993 | Lipinski et al. | 123/520 |

FOREIGN PATENT DOCUMENTS 0128438  8/1983  Japan ................... 123/520

*Primary Examiner*—John Rivell
*Attorney, Agent, or Firm*—Young & Thompson

[57] ABSTRACT

In a fuel system for motor vehicles, comprising a fuel tank, a fuel filler pipe with an opening into the tank, a first gas conduit, one end of which is positioned within the tank and whose opening determines the highest fuel level in the tank when filling the tank, and a second gas conduit which extends from an expansion space in the tank above said highest fuel level to a filter device; the improvement wherein the second gas conduit (4) includes a restriction device (9) which is so arranged that the flow resistance of the gas flow in the direction from the tank (1) to the filter device (8) is greater than in the opposite direction, and a pressure sensor (11) arranged to detect the pressure in the gas volume above the surface (N) of the fuel.

6 Claims, 2 Drawing Sheets

FUEL SYSTEM FOR MOTOR VEHICLES

The present invention relates to a fuel system for motor vehicles, comprising a fuel tank, a fuel filler pipe with an opening into the tank, a first gas conduit, one end of which is positioned within the tank and whose opening determines the highest fuel level in the tank when filling the tank, and a second gas conduit which extends from an expansion space in the tank above said highest fuel level to a filter device.

Fuel systems of the above type are known in which the filter device is a canister filled with active carbon, the purpose of which being to prevent fuel vapours escaping into the atmosphere from the expansion space when the fuel volume increases as its temperature rises. The gas conduit between the expansion space and the canister includes a restricted passage (just under 1.5 mm in diameter in a known embodiment) in order to slow down the gas flow from the tank to the canister, since otherwise overfilling of the tank into the expansion space would occur during filling up. This would happen due to the fuel not being forced along the normal breather pipe (the first gas conduit) to shut off the fuel nozzle when the fuel level reaches the opening to the breather pipe in the tank. The restriction is normally shaped so as to offer the same flow resistance in both flow directions. It is so adapted that fuel vapours and air can be forced out of the tank and sucked in with relatively low velocity at over-pressure and under-pressure respectively in the tank.

For environmental reasons, it is desirable if the airtightness of a fuel system can be periodically checked so as to be able to quickly establish whether any leaks are present through which fuel vapour could escape.

It is an object of the present invention to develop in a simple manner a fuel system that can be subjected to repeated tightness testing without risk of damage when the vehicle is in use and to enable the driver to immediately detect any leakage.

This object is achieved in accordance with the present invention by means of the second gas conduit including a restriction device which is so arranged that the flow resistance of the gas flow in the direction from the tank to the filter device is greater than in the opposite direction, and a pressure sensor being arranged to detect the pressure in the gas volume above the surface of the fuel.

The invention is generally based on the known technique of firstly subjecting a pressure-vessel to pressure and then measuring any pressure changes during a certain period. When testing a vehicle fuel tank, the signals generated by any pressure changes can be processed in a known computerized diagnostic system in the vehicle and faults can be indicated on a display in the vehicle dashboard. In practice, it is important that the tank be subjected to pressure for only a short period to thereby restrict the duration of the mechanical stresses on the walls of the tank. This is particularly important when using fuel tanks made of plastics material. The restrictor with less resistance in the direction towards the tank permits the pressure in the tank to quickly reach atmospheric pressure after the test has been performed, whilst at the same time the previously mentioned high flow resistance is maintained to eliminate the risk of overfilling.

Such a restrictor can quite simply have the shape of a conical nozzle with its narrow opening directed towards the fuel tank. Depending on its shaping, in this way a flow resistance which is 4 to 20 times greater in one direction than the other can be achieved. The absence of moving parts such as flap valves imparts high reliability and low costs, as does the lack of voltage feed.

Figure 2:
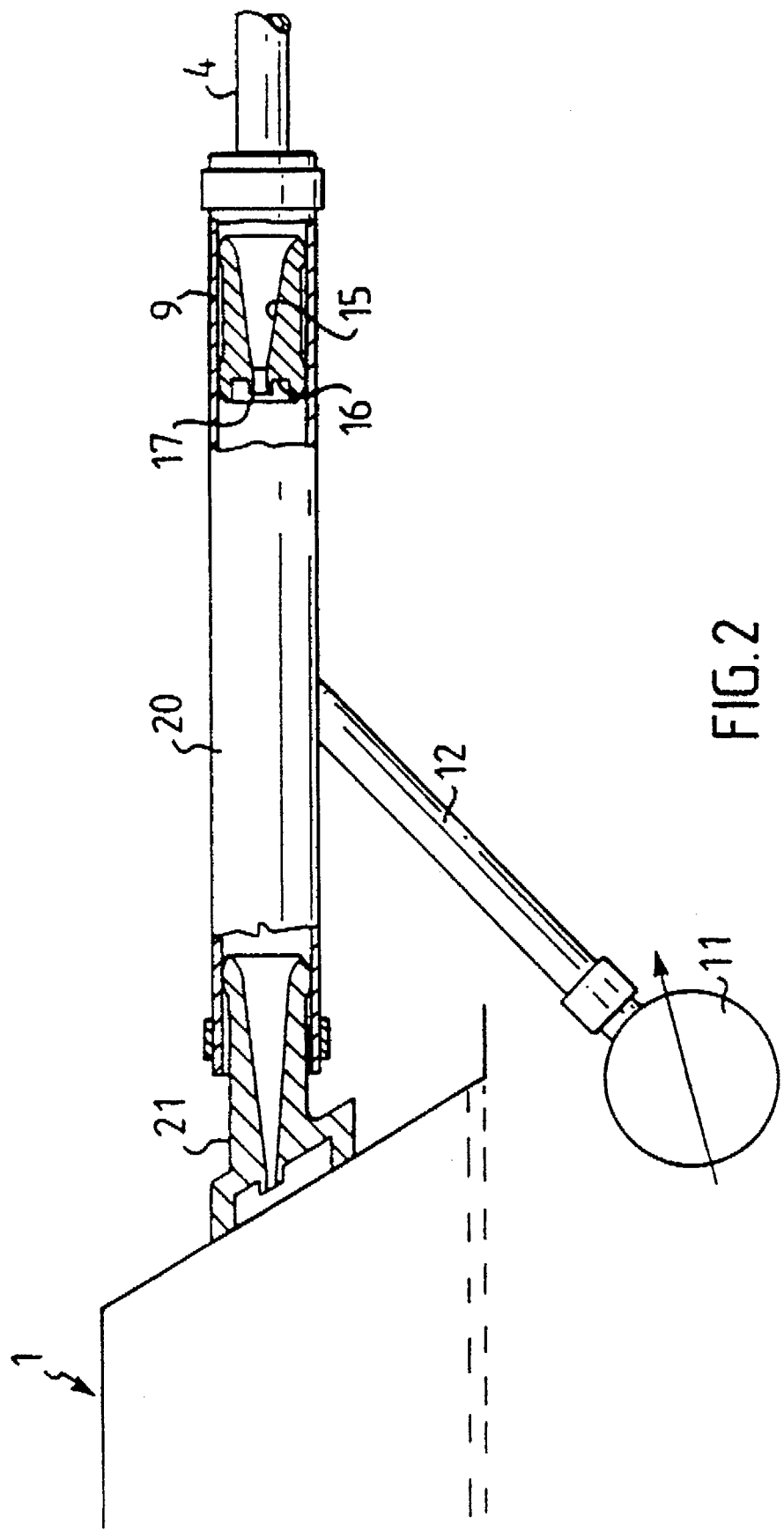

The invention will be described in greater detail by way of example only and with reference to the attached drawings in which FIG. 1 shows schematically an embodiment of a fuel system according to the invention, and FIG. 2 shows an enlargement of certain components of the system shown in FIG. 1.

In FIG. 1, reference numeral 1 denotes a fuel tank for a motor vehicle. N denotes the maximum fuel level and E an expansion space above the fuel. A fuel filler pipe 2, a breather pipe 3 and an expansion conduit 4 all communicate with the tank. The breather pipe 3 has an end 5, the position of which determines the maximum fuel level in the tank. The other end of the pipe 3 communicates in a known manner (not shown) with the upper end of the filler pipe. With the aid of a feed pump 7, fuel is fed to the not shown fuel injection system of the engine.

The expansion conduit 4 communicates with a filter device 8 which can constitute a canister filled with active carbon. A restrictor 9 and a roll-over valve 10 are located in the conduit 4 between the tank 1 and the canister 8. With the aid of a pressure sensor 11 in a branch pipe 12, the pressure in the expansion space E is detected. The canister communicates with the atmosphere via a valve 13, and a vacuum-creating device (not-shown) on the engine via a valve 14.

A restrictor 9 is shown in FIG. 2 in the form of a nozzle having a conical passage 15, the narrow end of which faces the tank and is provided with an annular recess 16 so that a sharp edge 17 is formed. This shaping of the nozzle 9 implies that a flow resistance in the direction towards the tank can be obtained which is between 5% and 25% of the resistance in the direction from the tank.

The arrangement according to the invention can be employed for tightness control of the tank 1 by closing the valve 13 when the engine is started, whilst the valve 14 is kept open until an underpressure of e.g. 2 kPa is recorded in the expansion space E, whereupon the valve 14 is also closed. The system is now totally closed and if no leaks are present, a constant pressure is detected by the pressure sensor for a certain predetermined measuring period. If certain pressure changes are registered, this implies that leaks are present and so a fault indication on the dashboard is given via the diagnostic system to which the sensor is connected. Once the tightness check has been performed, the valve 13 is opened to connect the expansion space to atmosphere. The shape of the nozzle permits very rapid pressure equalization to take place. The tightness check can be performed every time the engine is started and lasts in total for circa two minutes.

In the embodiments shown in FIGS. 1 and 2, the nozzle 9 is arranged in a tube 20 which forms a part of the expansion conduit 4 and to which the branch conduit 12 and the pressure sensor 11 are connected. In FIG. 2, the tube is attached to an expansion nozzle 21 which is fixed to an opening in the tank. The nozzle 21 has essentially the same shape and properties as the nozzle 9. On markets where for various reasons regular tightness checks of the fuel system are not desired, the tube 20 can be replaced by a straight tube without a branch conduit 12 and nozzle 9. In this way, the requirement for a large flow resistance in the direction towards the canister 8 and low resistance in the opposite direction is maintained. The advantage of this arrangement is the simplicity of adapting vehicles to various markets. A secondary effect obtained by arranging a restrictor with low flow resistance in the direction towards the tank is that the conventional under-pressure valve function in the vehicle fuel cap can be dispensed with. This function is maintained by the expansion nozzle 21 even when the nozzle 9 is dispensed with.

I claim:

1. In a fuel system for motor vehicles, comprising a fuel tank, a fuel filler pipe with an opening into the tank, a first gas conduit, one end of which is positioned within the tank and whose opening determines the highest fuel level in the tank when filling the tank, and a second gas conduit which extends from an expansion space in the tank above said highest fuel level to a filter device; the improvement wherein the second gas conduit (4) includes a restriction device (9) which is so arranged that the flow resistance of the gas flow in the direction from the tank (1) to the filter device (8) is greater than in the opposite direction, and a pressure sensor (11) arranged to detect the pressure in a gas volume above a surface (N) of fuel.

2. Fuel system according to claim 1, wherein the restriction device is a conical nozzle (9), a narrow opening of which faces the fuel tank (1).

3. Fuel system according to claim 2, wherein the narrow opening of the nozzle has a sharp edge (17).

4. Fuel system according to claim 2, wherein the nozzle (9) is so shaped that the flow resistance in the direction from the tank (1) towards the filter device (8) is 5 to 20 times greater than in the opposite direction.

5. Fuel system according to claim 1, wherein the filter device (8) is a canister filled with active carbon which, via valves (13, 14), communicates with the atmosphere and with vacuum-creating means in an internal combustion engine.

6. Fuel system according to claim 1, wherein the pressure sensor (11) is arranged in a conduit which branches from the second gas conduit (4).

* * * * *